Figure 1:
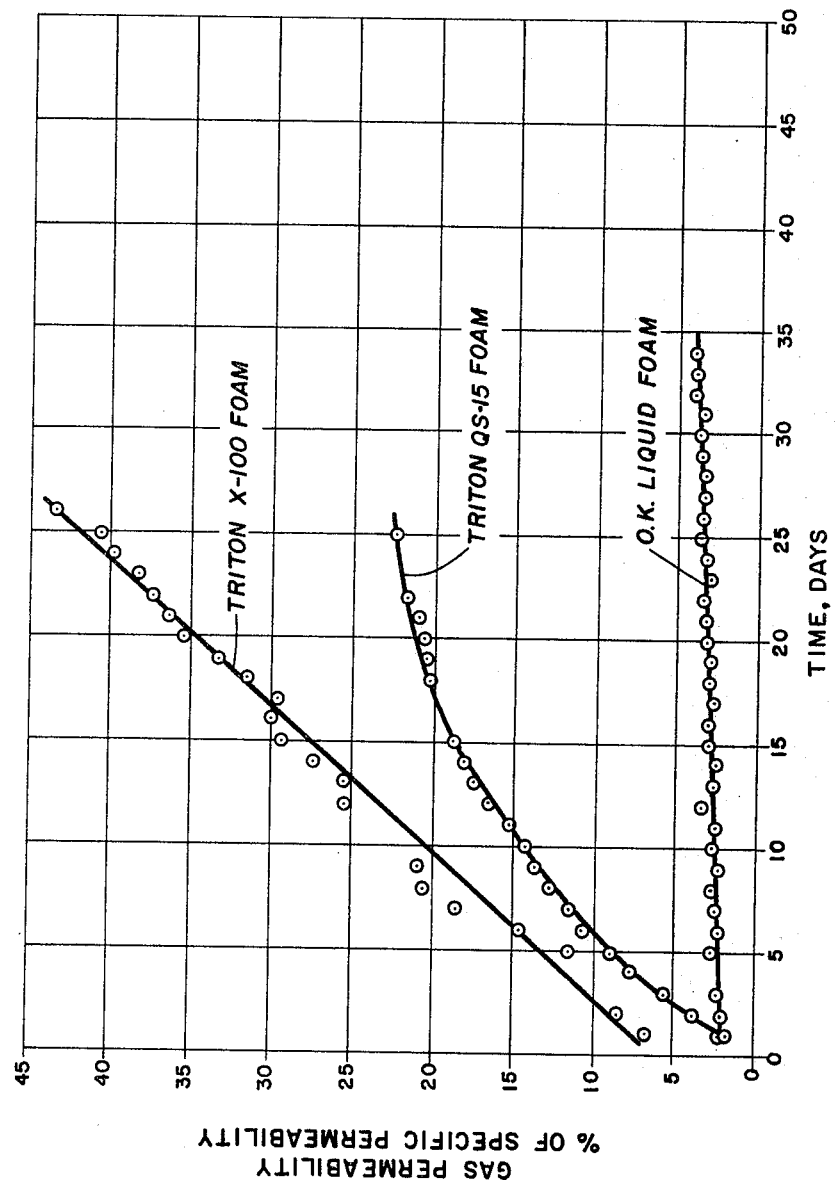

INVENTORS.
WILLIAM L. JACOBS
GEORGE G. BERNARD
BY
*Edward H Lang*
ATTORNEY.

United States Patent Office 3,330,346
Patented July 11, 1967

3,330,346
METHOD OF TREATING A SUBTERRANEAN FORMATION WITH A FOAM BANK
William L. Jacobs and George G. Bernard, Crystal Lake, Ill., assignors, by mesne assignments, to Union Oil Company of California, Los Angeles, Calif., a corporation of California
Filed Jan. 27, 1965, Ser. No. 428,478
10 Claims. (Cl. 166—9)

This invention relates to the unexpected discovery that a particular type and kind of surface-active agent or surfactant has been found to be far superior to all heretofore known surfactants in a broad spectrum of use. More specifically, this invention pertains to methods practiced upon underground formations wherein a foam is generated in situ in the formation or is generated above ground and thereafter injected into the formation. Even more specifically, the embodiments of this invention wherein the particular surfactant is used are applicable to oil recovery, underground fluid storage, subterranean strata plugging, fracturing, acidizing and any and all related processes wherein a foam or foam bank is an integral component of such operations.

The use of foam in secondary oil recovery was initially advanced by Bond and Holbrook in U.S. Patent 2,866,507 and augmented by the further investigations and experiments of Fried as exemplified by Bureau of Mines Report of Investigations 5866 (The Foam Drive Process for Increasing the Recovery of Oil, 1961). While known surfactants and surface-active agents from which foam was generated had proved to increase ultimate oil recoveries, it was found that many of the surfactants suffered in the aspects that the foams generated therefrom broke down readily, were not efficient in reducing strata permeability and were not capable of generating sufficient and tenacious amounts of foam in the presence of a two-phase system such as oil and connate water. It has now been found that a surfactant, surface-active agent or liquid detergent known commercially as "O K Liquid" marketed by the Proctor & Gamble Company overcomes all of the aforedescribed deficiencies. "O K Liquid" is an ammonium alkylpoly-oxyethylene) sulfate containing organic builders and is described in U.S. Patent 2,941,950 to Korpi et al., hereby incorporated by reference.

It is an object of this invention to provide a superior surfactant for methods of treating subterranean formations.

It is another object of this invention to provide a superior foam generated from a liquid detergent known commercially as "O K Liquid."

It is a further object of this invention to improve secondary oil recovery, subterranean formation permeability reduction, subterranean strata plugging and attendant operations, underground fluid storage processes and various sundry operations wherein a foam or foam bank comprises a part of the process and is generated from a liquid detergent known commercially as "O K Liquid."

These and other objects will become apparent from the following detailed description of the invention taken in conjunction with the drawings wherein:

FIGURE 1 depicts the improved ability of "O K Liquid" foam to reduce the permeability of a sand pack to gas over extended periods of time as compared to other well-known surfactant foams.

Figure 2:
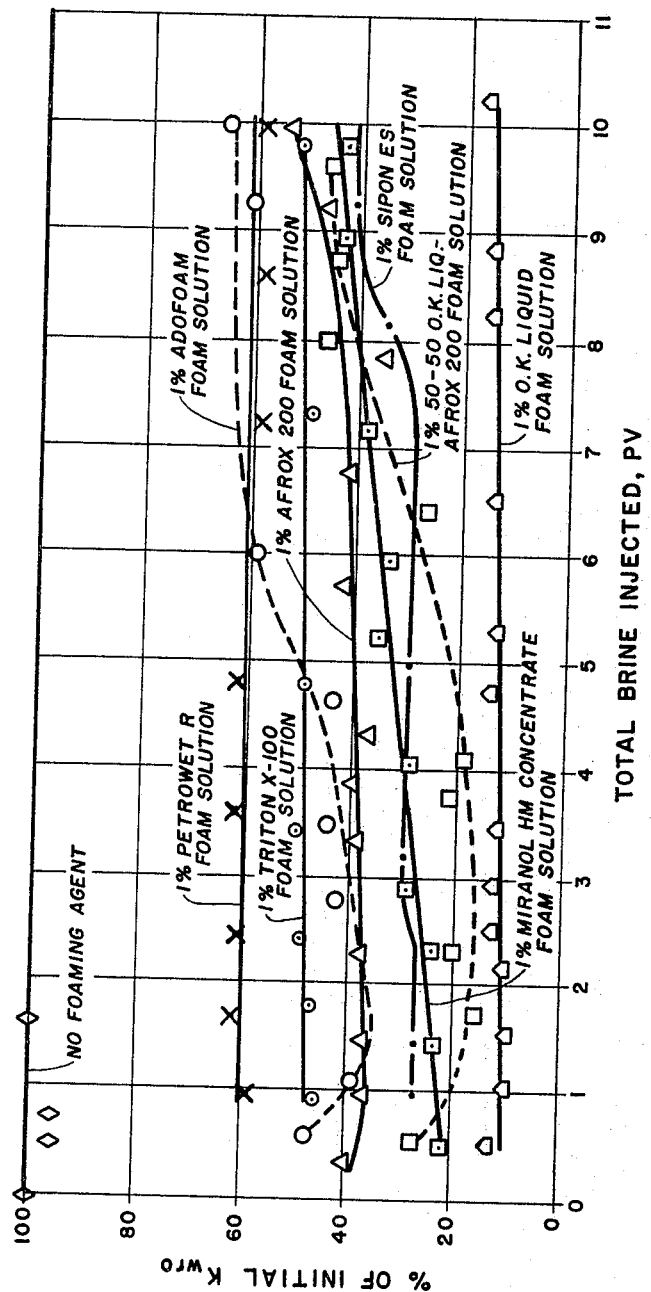

FIGURE 2 demonstrates the superior ability of a foam generated from "O K Liquid" to reduce the permeability of a sand pack to water as compared to foams generated from prior art surfactants.

Figure 3:
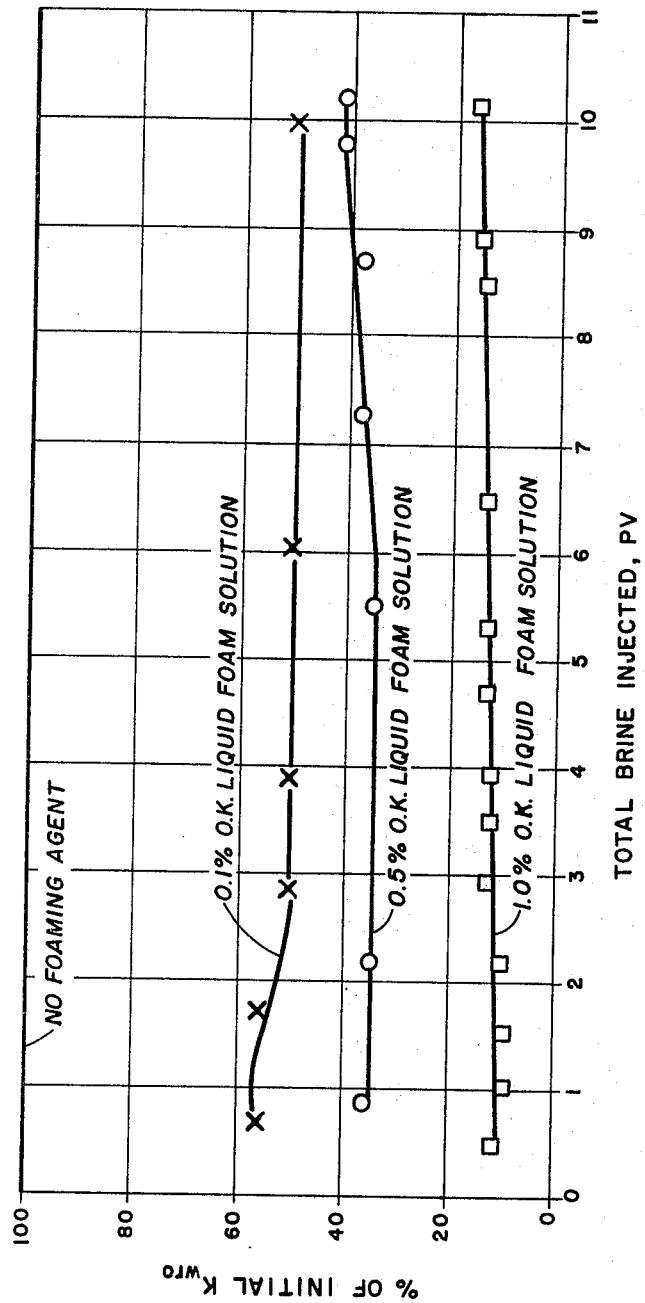
Figure 4:
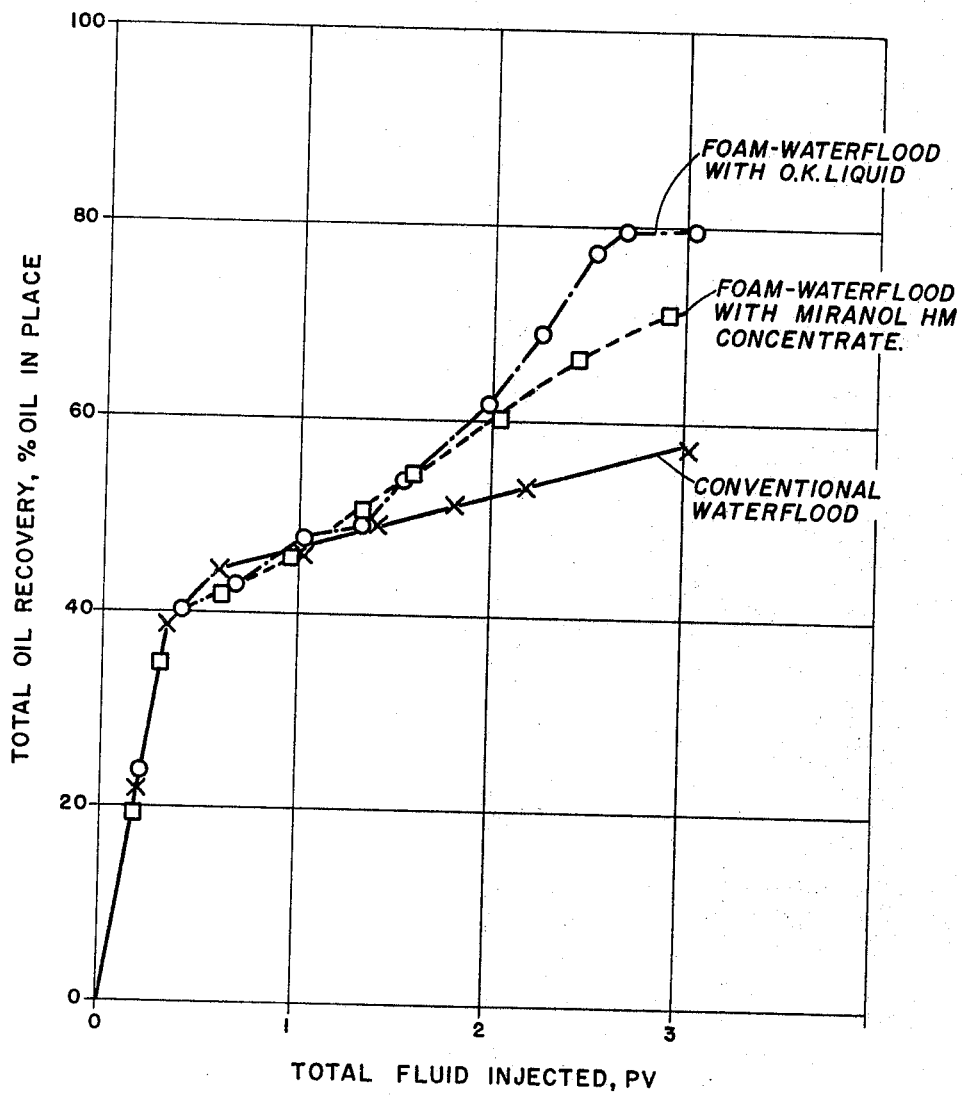

FIGURE 3 shows the desirable concentration of "O K Liquid" in a solution from which a foam is generated in order to reduce the permeability to water of a sand pack; and FIGURE 4 demonstrates the oil recovery capabilities of foam-waterflood methods wherein foams generated from "O K Liquid" and a prior art surfactant are compared with the results obtained in a conventional waterflood.

The areas wherein foams generated from "O K Liquid" may be utilized are innumerable and include: strata plugging and attendant processes as exemplified by U.S. copending applications such as Holbrook and Bernard, S.N. 160,660, filed Dec. 19, 1961; Bernard, S.N. 384,924, filed July 24, 1964, and Bernard, S.N. 385,067, filed July 24, 1964; foams in conjunction with miscible slug recovery processes such as Bernard, Holbrook, S.N. 158,575, filed Dec. 11, 1961; Holm, Csaszar, S.N. 255,161, filed Jan. 31, 1963; O'Brien, Holm, S.N. 325,439, filed Nov. 21, 1963; and Rai, Bernard, S.N. 399,823, filed Sept. 28, 1964; and other unique secondary and tertiary oil recovery processes such as Bernard, Holm, S.N. 360,768, filed Apr. 17, 1964; Bond, Bernard, S.N. 387,768, filed Aug. 5, 1964; and also for the subterranean storage of fluids such as Bernard, Holm, S.N. 294,497, filed July 12, 1963; Bernard, S.N. 294,755, filed July 12, 1963; and O'Brien, S.N. 372,762, filed June 5, 1964. Thus in any method of treating a subterranean formation wherein a foam bank is disposed within the interstices of the formation the invention will consist of generating the foam or foam bank from a liquid detergent known commercially as "O K Liquid." The foam may be generated from an aqueous solution containing from about 0.01 to 10.0 wt. percent of the liquid detergent commercially known as "O K Liquid" which liquid detergent composition consists essentially of:

(a) 25–40% of a sulfated and neutralized reaction product obtained from (1) condensing 1 to 5 moles of ethylene oxide and 1 mole of monohydric alcohol of from 10–16 carbon atoms in the molecule; (2) sulfating the condensation product of (1); (3) neutralizing the sulfated product of (2) with a neutralizing agent selected from the group consisting of ammonia and alkylol-substituted ammonia having from 2–3 carbon atoms in the alkylol group;

(b) An organic builder substance consisting essentially of alkylol amide of saturated fatty acids having 10, 12 and 14 carbon atoms and an alkylol amine, said alkylol amide having not more than 3 carbon atoms in each alkylol radical and the amount thereof being from 6 to 12% of the composition;

(c) 15–25% of alcohol selected from the group consisting of ethanol, normal propanol and isopropanol;

(d) Not over 5% of extraneous substances (such as sulfates and chlorides of the ammonia or substituted ammonia used, plus unsulfated alkyl ethers and other reaction products); and (e) Water to make 100%.

The gases used to generate the foam are those commonly known in the art such as air, nitrogen, carbon dioxide, flue gas etc., and mixtures thereof.

Fried, in his foam experiments, enumerated some 24 different surfactants utilized to generate foam. The prior art contains prolific tabulations as to the many surfactant materials available from which foams could be generated. However, in order to determine their effectiveness from many aspects of intended use, a series of preliminary screening tests were run in order to demonstrate the improved results of a foam wherein the foam is generated from "O K Liquid." The results of the preliminary screening test are tabulated in Table I.

TABLE I.—EVALUATION OF SURFACTANTS FOR USE AS FOAMING AGENT FOR MIXTURES OF OIL AND BRINE

| Surfactant Trade Name | Manufacturer | Composition | Type | Foam Stability Rating [a] |
|---|---|---|---|---|
| Triton X-45 | Rohm and Haas Co | Isooctyl phenyl polyethoxy ethanol (99%) | Nonionic | 0 |
| Triton X-114 | ----do---- | ----do---- | ----do---- | 0 |
| Triton X-100 | ----do---- | ----do---- | ----do---- | 4 |
| Triton X-102 | ----do---- | ----do---- | ----do---- | 18 |
| Triton X-165 | ----do---- | Isooctyl phenyl polyethoxy ethanol (70%) | ----do---- | 22 |
| Triton X-200 | ----do---- | ----do---- | ----do---- | 16 |
| Triton X-205 | ----do---- | ----do---- | ----do---- | 15 |
| Triton X-305 | ----do---- | ----do---- | ----do---- | 12 |
| Triton CF-32 | ----do---- | Amine polyglycol condensate (95%) | ----do---- | 1 |
| Triton B-1956 | ----do---- | Modified phthalic glycerol alkyd resin (77%) | ----do---- | 0 |
| Triton GR-5 | ----do---- | Dioctyl sodium sulfosuccinate (60%) | Anionic | 1 |
| Triton QS-15 | ----do---- | Sodium salt of amphoteric surfactant | Amphoteric | 0 |
| Triton QS-30 | ----do---- | ----do---- | ----do---- | 0 |
| Afrox 200 | Baroid Division, National Lead Co | Alkyl polyoxyethylene | Nonionic | 10 |
| Tween 85 | Atlas Chemical Industries | Polyoxyethylene sorbitan trioleate | ----do---- | 0 |
| Arquad T-2C | Armour Industrial Chemical Co | n-Alkyl trimethyl ammonium chloride | Cationic | 1 |
| Cyanamid RC-249 | American Cyanamid Co | | | 26 |
| Cyanamid RC-265 | ----do---- | | | 0 |
| O K Liquid | Proctor & Gamble Co | Modified ammonium alkylsulfate and organic builder (40%) | Anionic and Nonionic | 32 |
| P.G. Foaming Agent #29 | ----do---- | | | 11 |
| Aliquat 4 | General Mills, Inc | N-fatty trimethyl quaternary ammonium chloride (50%) | Cationic | 0 |
| Alifoam 4 | ----do---- | ----do---- | ----do---- | 10 |
| Aliquat H226 | ----do---- | N-difatty dimethyl quaternary ammonium chloride (75%) | ----do---- | 0 |
| Armomist No. 1 | Armour Industrial Chemical Co | | | 1 |
| Adofoam | Admite Sales Div., Conoco Petrochemicals | 50% active blend of nonionic and anionic surfactants | Anionic and Nonionic | 35 |
| Adofoam (no foam stabilizer) | ----do---- | | | [a]2 |
| Gafen FA-1 | Antara Chemicals | | Anionic | 12 |
| Gafen FA-5 | ----do---- | | Nonionic | 8 |
| Gafen FA-6 | ----do---- | Alkyl poly (ethyleneoxy) ethanol | ----do---- | 9 |
| Gafen FA-7 | ----do---- | Alkylaryl polyethyleneoxy ester (50%) | Anionic | 0 |
| Gafac PE-510 | ----do---- | Free acid of complex organic phosphate ester | ----do---- | 1 |
| Gafac LO-529 | ----do---- | Sodium salt of complex organic phosphate ester (88%) | ----do---- | 6 |
| Gafac RM-410 | ----do---- | Free acid of complex organic phosphate ester | ----do---- | [b] |
| Gafac RM-510 | ----do---- | ----do---- | ----do---- | 2 |
| Gafac RM-710 | ----do---- | ----do---- | ----do---- | 5 |
| Gafac RM-455 | ----do---- | | | 0 |
| Emulphogene BC-610 | ----do---- | Tridecyloxypoly (ethyleneoxy) ethanol | Nonionic | 9 |
| Emulphogene BC-720 | ----do---- | ----do---- | ----do---- | 7 |
| 925 Synfoam #1 | Swift & Company | | | 3 |
| 931 Synfoam #3 | ----do---- | | | 3 |
| Solar C.O. Liquid Concentrate | ----do---- | Coconut oil fatty acid amine condensate | Nonionic | 0 |
| L-520 Silicone | Union Carbide Chemicals Co | Organo-silicone copolymer | | 1 |
| Dowell G 2 | Dowell Div. of Dow Chemical Co | Polyoxyethylated alkyl phenol | Nonionic | 2 |
| Sipon ES | Alcolac Chemical Corp | Sodium salt of lauryl ether sulfate (30%) | Anionic | 40 |
| Tergitol Nonionic TMN | Union Carbide Chemicals Co | Trimethyl nonyl ether of polyethylene glycol | Nonionic | 1 |
| Ninol 2012 Extra | Stepan Chemical Co | Coconut fatty acid diethanolamide (90% amide) | ----do---- | <1 |
| Stepan LIPA | ----do---- | Fatty acid alkanolamide | ----do---- | [b] |
| Carboxane TW | Textilana Corp | Fatty alcohol ethoxylated (85%) | ----do---- | 14 |
| Culide SAL-9 | Culver Chemical Corp | Lauryl diethanolamide (90%) | ----do---- | 2 |
| Culide LMP-9 | ----do---- | Mixed fatty acid diethanolamide (90%) | ----do---- | 0 |
| Hagan S-1 | Hagan Chemicals and Controls, Inc | | ----do---- | 0 |
| Hertex | Apex Chemical Co | Modified aryl alkyl sulfonate (25%) | Anionic | 9 |
| Tetronic 704 | Wyandotte Chemicals Corp | | | 10 |
| Tetronic 908 | ----do---- | | | 12 |
| Pluronic L44 | ----do---- | Condensation product of ethylene oxide with propylene glycol | Nonionic | 0 |
| Pluronic L62 | ----do---- | | | 0 |
| Pluronic L64 | ----do---- | | | 2 |
| Pluronic F68 | ----do---- | | | 12 |
| Pluronic L72 | ----do---- | | | 0 |

[a] Test mixture: 12.5 cc. Dollarhide crude oil plus 37.5 cc. of 1.5% brine solution containing 1% surfactant; Reference mixture=12.5 cc. of 1.5% brine solution plus 37.5 cc. of 1.5% brine solution containing 1% Triton X-100.
[b] Insoluble in $H_2O$.

TABLE Ia.—EVALUATION OF SURFACTANT BLENDS FOR USE AS FOAMING AGENT FOR MIXTURES OF OIL AND BRINE

| Blend | Type | Foam Stability Rating [a] |
|---|---|---|
| 50% O K Liquid plus 50% RC-249 | Anionic and Nonionic | 26 |
| 50% O K Liquid plus 50% Afrox 200 | Anionic and Nonionic | 34 |
| 50% Alifoam 4 plus 50% Aliquat H226 | Cationic | <1 |
| 50% Triton X-100 plus 50% Afrox 200 | Nonionic | 7 |
| 50% Afrox 200 plus 50% Solar C.O. Liquid Concentrate | ----do---- | 0 |
| 50% Hertex plus 50% Emulphogene BC-720 | Anionic and Nonionic | 11 |
| 25% Hertex plus 75% Emulphogene BC-720 | ----do---- | 12 |
| 50% Hertex plus 50% Triton X-100 | ----do---- | 2 |
| 50% Hertex plus Gafen FA-6 | ----do---- | 6 |
| 50% Triton X-100 plus 50% Sipon ES | ----do---- | 26 |

[a] See footnote (a) Table I.

The laboratory ratings shown in Table I were obtained by testing the various surfactants for their ability to foam in a mixture consisting of 25 vol. percent of a Dollarhide crude oil and 75 vol. percent brine (1.5 wt. percent NaCl) solution. The preliminary screening test procedure consisted in placing 12.5 cc. of the crude oil and 37.5 cc. of the brine solution containing 1% foaming agent in a 250 cc. glass stoppered graduate. The graduate was shaken vigorously for 1 minute and then allowed to stand for 10 minutes. The volume of foam above the 50 cc. mark on the graduate was noted and compared with the volume of foam obtained with a reference mixture. The reference mixture which was assigned a foam stability rating of 10 consisted of 12.5 cc. of brine solution and 37.5 cc. of brine solution containing 1% "Triton X-100." Thus, in the actual screening test 12.5 cc. of oil in the test mixture was replaced by 12.5 cc. of brine in the reference mixture. "Triton X-100" was employed as the reference for the screening test because it had previously been found effective as a foaming agent for reducing the permeability of pore systems to water with no residual oil present.

Seventeen commercial surfactants and five surfactant blends were found to have foam stability ratings of 10 or better. The best 5 of these materials were further tested to determine their ability to reduce the permeability of porous media to water in the presence of oil. Although "Triton X-100" showed good foam stability with brine solution alone and reduced the permeability of a Boise sandstone core to water to 1% of its initial value, its foam rating was only 4 in the presence of Dollarhide crude oil and brine. Thus, "Triton X-100" was considered a relatively poor foaming agent for reducing the permeability to water in the presence of oil, which observation was later substantiated by an experiment with a Boise sandstone core containing oil.

On the basis of the foam stability test, as set forth in Table I, two foaming agents, "O K Liquid" and "Adofoam," appeared to exceed the results obtained with other foaming agents in mixtures of oil and brine. To ascertain the foam stability characteristics of these surfactants with various crude oils, a series of tests were conducted with different crudes such as those obtained from Adena, Alluwe, Mead Strawn and Dollarhide fields. These oils have the following characteristics:

|  | Adena | Alluwe | Dollarhide | Mead Strawn |
|---|---|---|---|---|
| Gravity, ° API | 40.5 | 37.3 | 35.2 | 41.3 |
| Viscosity, cp.: |  |  |  |  |
| 70° F | | | 5.31 | 6.53 | 3.25 |
| 80° F | | 2.06 | | | |
| 100° F | | | 3.54 | 4.16 | 2.30 |

These results are indicated in Table II and demonstrate that the stability of foams is independent of the crude oil used in the screening test.

TABLE II

| Surfactant | Foam Stability Rating [a] | | | |
|---|---|---|---|---|
|  | Adena Crude | Alluwe Crude | Dollarhide Crude | Mead Strawn Crude |
| "O K Liquid" | 33 | 31 | 32 | 30 |
| "Adofoam" | 32 | | 35 | 35 |

[a] Test Mixture: 12.5 cc. crude oil plus 37.5 cc. of of 1% foaming agent in 1.5% brine.

Table III presents the foam stability ratings of "O K Liquid" and "Adofoam" when tested with 1.5%, 5.5% and 11.0% NaCl solution. Foam stability was affected by the salt concentration of the water used in this screening test; increasing the salt content decreased the foam stability of both "O K Liquid" and "Adofoam."

TABLE III

| Surfactant | Foam Stability Rating [a] | | |
|---|---|---|---|
|  | 1.5% NaCl | 5.5% NaCl | 11.0% NaCl |
| "O K Liquid" | 32 | 10 | 5 |
| "Adofoam" | 35 | 21 | 14 |

[a] Test Mixture: 12.5 cc. Dollarhide crude oil plus 37.5 cc. of 1% foaming agent in brine.

These results show that brine concentration would be an important factor in selecting a foaming agent for use in a particular reservoir. However, other experiments indicated that the presence of 6% brine in a sand pack did not noticeably affect the plugging characteristics of foam.

Referring specifically to FIGURE 1, there is shown the graphical results of a series of experiments which were conducted utilizing a 35-foot sand pack in order to determine the effect of foam on gas flow in porous media. The specific permeability of the No. 16 sand to air, $K_a$, was 4,000 millidarcies and its effective permeability to air at residual oil saturation (12% pore volume) and connate water saturation (22% pore volume) was 3,450 millidarcies. In each experiment the sand pack was initially saturated with 11% brine solution. The sand pack was then driven with Dollarhide crude oil to connate water saturation and waterflooded with 11% brine solution to residual oil saturation. Then a 20% pore volume slug of a 1% solution of foaming agent in 11% brine was injected into the sand pack. Three different experiments were conducted wherein "Triton X-100," "O K Liquid," and "Triton QS-15" were utilized as the foaming agent material. After the injection of the solution of foaming agent, natural gas or nitrogen was then injected and after gas breakthrough occurred, the permeability of the sand to gas was measured daily. The results of these experiments are tabulated below and are depicted graphically in FIGURE 1.

TABLE IV

| Run No | 1 | 2 | 3 |
|---|---|---|---|
| Initial Sand Pack Saturations (Percent PV): | | | |
| $S_o$ | 12 | 16 | 16 |
| $S_w$ | 88 | 84 | 84 |
| Foaming Agent | "Triton X-100" | "O K Liquid" | "Triton QS-15" |
| Gas Used | Natural Gas | Natural Gas | Nitrogen |
| Sand Pack Pressure (p.s.i.g.): | | | |
| Inlet | [a] 150 | 150 | 50 |
| Outlet | 0 | 0 | 0 |
| Steady-State Sand Pack Saturations (Percent PV): | | | |
| $S_o$ | 11 | 15 | 15 |
| $S_w$ | 11 | 14 | 13 |
| $S_g$ | 78 | 71 | 72 |
| Elapsed Time, Days | 25 | 33 | 24 |
| Initial Gas Permeability ($K_g$), md. [b] | 275 | 90 | 80 |
| Final Gas Permeability ($K_g$), md. [b] | 1,740 | 170 | 900 |

[a] After 13 days, when the gas permeability had increased to 1,000 millidarcies, the inlet pressure was reduced to 50 p.s.i.g.
[b] With foam present.
$S_o$ = oil saturation; $S_w$ = water saturation; and $S_g$ = gas saturation.

From FIGURE 1, it is readily apparent that the curve captioned "O K Liquid Foam" was the most stable over an extended period of time and was the most effective in reducing the permeability to gas in the presence of residual oil.

Referring specifically to FIGURE 2 there is shown the results obtained when using foams generated from various surfactants demonstrating the effectiveness of reducing the permeability of a 2-foot sand pack to water. The superior results obtained when utilizing "O K Liquid" are quite apparent. The experimental procedure utilized to obtain the data from which the curves of FIG- URE 2 were constructed comprised packing a 2-foot long, 1½" inside diameter Lucite tube with a No. 16 grade sand. The sand had a typical size analysis of 4.5% of 100–140 mesh, 55.5% of 140–200 mesh and 40% of 200 mesh sand. The Lucite tube was filled with fresh sand prior to each experiment and the permeability of the sand to water, $K_w$, varied between 4600–5400 millidarcies. The sand pack was initially saturated with brine (1.5 wt. percent NaCl) solution and driven to connate water with Dollarhide crude oil and water-flooded with brine to residual oil saturation. The effective permeability of the sand to water at residual oil saturation, $K_{wro}$, was then determined. One pore volume of a 1% solution of foaming agent in brine was injected into the sand pack followed by air injection until the gas saturation was approximately 50% PV. Waterflooding with brine solution was then resumed and the effective permeability to water, $K_{wro}$, was frequently determined until 10 PV of brine had been injected. A base run was also carried out to show what effect air alone, without the presence of foam solution, would have on the permeability of the sand pack to water. The results of the series of experiments are depicted in the following Table V.

experiments along with the results obtained for runs 4 and 6 of Table V are graphically depicted in FIGURE 3. FIGURE 3 conclusively demonstrates that decreasing the concentration of "O K Liquid" in a foam solution injected into the sand pack decreases the ability of the resulting foam to reduce the permeability to water.

In order to test the observations made during the course of the aforedescribed experiments in practical applications such as for example, oil recovery, a series of three experiments were carried out on a facsimile subterranean formation which consisted of two 9-foot, interconnected parallel sand packs, one pack having a permeability of 31,000 md. and the other a permeability of 4610 md. Thus, the apparatus represented the high and low permeability zones in a simulated reservoir. Prior to each experiment the two sand packs were initially saturated with brine solution and separately driven to connate water saturation with Dollarhide crude oil. All of the conditions such as ambient temperature, injection pressures etc. were kept as nearly identical as possible. The first experiment comprised a conventional water flood with brine solution. The next two experiments comprised injecting 0.5% pore volume of 1% foam solution in brine followed by air in-

TABLE V.—EVALUATION OF FOAMING AGENTS FOR REDUCING THE PERMEABILITY TO WATER

| | Run No. | | | | | | | | | | |
|---|---|---|---|---|---|---|---|---|---|---|---|
| | 4 | 5 | 6 | 7 | 8 | 9 | 10 | 11 | 12 | 13 | 14 |
| | Foaming Agent | | | | | | | | | | |
| | None | "Afrox 200" | "O K Liquid" | "Adofoam" | 50% "O K Liquid" 50% "Afrox 200" | "Sipon ES" | "Triton X-100" | "Miranol HM Concentrate" | "Petrowet R" | | |
| | Concentration, Percent | | | | | | | | | | |
| | | 1.0 | 1.0 | 1.0 | 1.0 | 1.0 | 1.0 | 1.0 | 1.0 | 1.0 | 1.0 |
| Initial Sand Pack Saturation: | | | | | | | | | | | |
| $S_w$ | 0.75 | 0.76 | 0.84 | 0.85 | 0.86 | 0.86 | 0.87 | 0.86 | 0.77 | 0.78 | 0.82 |
| $S_{ro}$ | 0.25 | 0.24 | 0.16 | 0.15 | 0.14 | 0.14 | 0.13 | 0.14 | 0.23 | 0.22 | 0.18 |
| Initial Effective Permeability, md., $K_{wro}$ | 1,950 | 1,960 | 1,585 | 2,536 | 1,890 | 1,600 | 2,180 | 2,184 | 1,270 | 1,475 | 1,710 |
| PV of Foam Solution Injected | | 1 | 1 | 1 | 1 | 1 | 1 | 1 | 1 | 1 | 1 |
| Gas Saturation After Air Injection, Percent PV | | 50 | 50 | (ᵃ) | 50 | (ᵃ) | 50 | (ᵃ) | 50 | 50 | 50 |
| Effective Permeability After Injecting 1 PV of Water, md., $K_{wro}$ | 1,960 | 724 | 79 | 368 | 580 | 769 | 436 | 580 | 600 | 365 | 1,000 |
| Effective Permeability After Injecting 10 PV of Water, md., $K_{wro}$ | | 1,065 | 206 | 491 | 1,290 | 1,031 | 1,010 | 926 | 667 | 615 | 1,000 |
| Percent of Initial Effective Permeability: | | | | | | | | | | | |
| After Injecting 1 PV of Water | 100 | 37 | 5 | 15 | 31 | 48 | 20 | 27 | 47 | 25 | 58 |
| After Injecting 10 PV of Water | | 54 | 13 | 19 | 68 | 64 | 46 | 42 | 52 | 42 | 58 |

ᵃ Foam solution and air injected simultaneously until 1 PV of foam solution had been injected.
$S_w$=water saturation, $S_{ro}$=residual oil saturation, $K_{wro}$=permeability to water at residual oil saturation.

In runs No. 7, 9 and 11 the foam solution and air were injected simultaneously until 1 pore volume of foam solution had been injected before waterflooding was resumed. It is significant to note that the injection of a foam solution followed by air was slightly more efficient for reducing the permeability to water than the simultaneous injection of foam solution and air particularly in the period immediately after foam solution injection. The data clearly shows that "O K Liquid" is the most effective foaming agent for reducing the permeability to water in the presence of residual oil. This reduction in permeability was maintained even after injecting 10 pore volumes of brine.

To determine what effect, if any, the concentration of foaming agent in the foam solution had upon the ability of a foam to reduce saturation to water, two experiments, similar in every respect to run No. 6 numerated in Table V, were conducted except that in one run, the concentration of "O K Liquid" was 0.1% and in the other run the concentration was 0.5%. The results obtained in these jection to 0.25 pore volume gas saturation prior to waterflooding with brine. Each foam experiment was identical except for the types of surfactants utilized to generate the foam. In the first foam experiment, the surfactant utilized was one of the surfactants disclosed by Fried and found to have the most efficient foam characteristics as heretofore described and is known commercially as "Miranol HM Concentrate." The second foam experiment comprised utilizing "O K Liquid." The data obtained from these experiments is set forth in FIGURE 4 wherein it is readily apparent that a foam generated from "O K Liquid" yielded the greatest oil recovery in these experiments within the range of 2½ to 3 pore volumes of total fluids injected which amount comprises that normally used in field practice. In all three experiments, the maximum oil recovery (80% oil in place) from the high permeability zone was reached after injecting about 2 pore volumes of fluid. The oil production rate from the low permeability zone was dependent on the volume of injected brine entering the zone relative to that entering the high permeability zone. Thus, the injection of foam solution followed by air resulted in the selective plugging of the permeability zone and permitted the larger portion of the injected brine to enter the low permeability zone. It is apparent that "O K Liquid" improves the efficiency of waterflooding over that heretofore available with known surfactants such as "Miranol HM Concentrate."

While the actual application of our discovery has been proven by practicing the disclosed invention in the secondary recovery of oil, it is readily apparent from other experiments attesting to the ability of a foam generated from "O K Liquid" to reduce formation permeability, that the invention may be practiced upon subterranean formations in conjunction with fluid storage, fracturing, acidizing and those secondary recovery methods wherein a petroleum solvent or an oxygenated hydrocarbon is disposed before or after a foam bank and all applications pertaining to the treatment of the subterranean formations utilizing a surfactant in the foam state. Thus, many derivations of the disclosed invention may be practiced without departing from the spirit of the herein disclosed invention.

The amount of gas injected subsequent to the surfactant, surface-active agent, detergent or aqueous solutions is that amount that will substantially completely foam the surfactant, surface-active agent or detergent. Generally, about 0.1 to 1.0 pore volume of a gas, measured at about 1 atmosphere and 60° F., will suffice.

The embodiments of this invention in which an exclusive property or privilege is claimed are defined as follows:

1. In the method of treating a subterranean oil-bearing formation wherein a foam bank is driven through at least a poriton of said formation, the improvement which comprises generating said foam bank from a liquid detergent composition consisting essentially of:
   (a) 25–40% of a sulfated and neutralized reaction product obtained from (1) condensing 1 to 5 moles of ethylene oxide and 1 mole of monohydric alcohol of from 10–16 carbon atoms in the molecule; (2) sulfating the condensation product of (1): (3) neutralizing the sulfated product of (2) with a neutralizing agent selected from the group consisting of ammonia and alkylol-substituted ammonia having from 2–3 carbon atoms in the alkylol group;
   (b) an organic builder substance consisting essentially of alkylol amide of saturated fatty acids having 10, 12 and 14 carbon atoms and an alkylol amine, said alkylol amide having not more than 3 carbon atoms in each alkylol radical and the amount thereof being from 6 to 12% of the composition;
   (c) 15–25% of alcohol selected from the group consisting of ethanol, normal propanol and isopropanol;
   (d) not over 5% of extraneous substance (such as sulfates and chlorides of the ammonia or substituted ammonia used, plus unsulfated alkyl ethers and other reaction products); and
   (e) water to make 100%.

2. The method in accordance with claim 1 wherein said formation is penetrated by at least one injection well and one production well and the foam bank is generated in situ and is substantially displaced from the injection well to the production well by means of a fluid drive.

3. The method in accordance with claim 2 wherein said fluid is a gas.

4. The method in accordance with claim 3 wherein said gas is air.

5. The method in accordance with claim 2 wherein said fluid is a liquid.

6. The method in accordance with claim 5 wherein said liquid is water.

7. The method of recovering petroleum oil from a subterranean oil-bearing formation penetrated by at least one injection well and one production well comprising injecting into said injection well and into said formation in sequential order:
   (1) 0.001 to 0.1 pore volume of a liquid detergent consisting essentially of:
      (a) 25–40% of a sulfated and neutralized reaction product obtained from (1) condensing 1 to 5 moles of ethylene oxide and 1 mole of monohydric alcohol of from 10–16 carbon atoms in the molecule; (2) sulfating the condensation product of (1); (3) neutralizing the sulfated product of (2) with a neutralizing agent selected from the group consisting of ammmonia and alkylol-substituted ammonia having from 2–3 carbon atoms in the alkylol group;
      (b) an organic builder substance consisting essentially of alkylol amide of saturated fatty acids having 10, 12 and 14 carbon atoms and an alkylol amine, said alkylol amide having not more than 3 carbon atoms in each alkylol radical and the amount thereof being from 6 to 12% of the composition;
      (c) 15–25% of alcohol selected from the group consisting of ethanol, normal propanol and isopropanol;
      (d) not over 5% of extraneous substances (such as sulfates and chlorides of the ammonia or substituted ammonia used, plus unsulfated alkyl ethers and other reaction products); and
      (e) water to make 100%.
   (2) 0.1 to 1.0 pore volume of a gasiform fluid, measured at about 1 atmosphere and 60° F., to substantially completely foam said liquid detergent;
   (3) 1.0 to 5.0 pore volumes of a driving fluid to drive the foam through the formation towards said production well; and producing fluids from said production well until further production becomes uneconomical.

8. The method in accordance with claim 7 wherein said liquid detergent is incorporated in 0.001 to 0.1 pore volume of an aqueous solution and comprises about 0.01 to 10.0 wt. percent of said solution.

9. The method in accordance with claim 8 wherein said gasiform fluid is selected from the group consisting of nitrogen, air, natural gas and mixtures thereof and is measured at about 1 atmosphere and 60° F.

10. The method in accordance with claim 9 wherein said driving fluid is selected from the group consisting of nitrogen, air, natural gas, water and mixtures thereof.

References Cited

UNITED STATES PATENTS

| | | | |
|---|---|---|---|
| 2,941,950 | 6/1960 | Korpi et al. | 252—153 |
| 3,177,939 | 4/1965 | Holm et al. | 166—9 |

OTHER REFERENCES

J. W. McCutcheon: "Detergents and Emulsfiers," D and E, 1963, Annual (p. 105).

CHARLES E. O'CONNELL, *Primary Examiner.*

JAMES A. LEPPINK, *Examiner.*